E. F. GUNN.

Breech-Loading Fire-Arms.

No. 6,025. Reissued Aug. 25, 1874.

Witnesses:
A. Sellers
A. Kinnier

Inventor:
E. F. Gunn
per Brown Coombs & Co
Attys

THE GRAPHIC CO. PHOTO-LITH. 39 & 41 PARK PLACE, N.Y.

UNITED STATES PATENT OFFICE.

EDWIN F. GUNN, OF CHARLESTON, SOUTH CAROLINA.

IMPROVEMENT IN BREECH-LOADING FIRE-ARMS.

Specification forming part of Letters Patent No. 85,442, dated December 29, 1868; reissue No. 6,025, dated August 25, 1874; application filed July 10, 1874.

*To all whom it may concern:*

Be it known that I, EDWIN F. GUNN, of Charleston, in the district of Charleston and State of South Carolina, have invented a new and useful Improvement in Breech-Loading Fire-Arms, of which the following is a full, clear, and exact description, reference being had to the accompanying drawing forming a part of this specification.

My invention consists in a keeper or retainer to the cartridge after its insertion, and while the breech is open, the same being closed by the action of an independent spring, and opened, when it is required to extract the discharged shell, by or through a special movement of the breech-block or its spring; and the invention also consists in a shell-extractor, arranged for operation in connection with a shell keeper or retainer by or through the breech-block or its spring; and, furthermore, the invention consists in a shell-extractor, arranged for operation in connection with a downwardly-swinging breech-block, said breech-block being operated by or through the medium of a thumb-piece projecting above the frame, substantially as hereinafter described.

Figure 1:
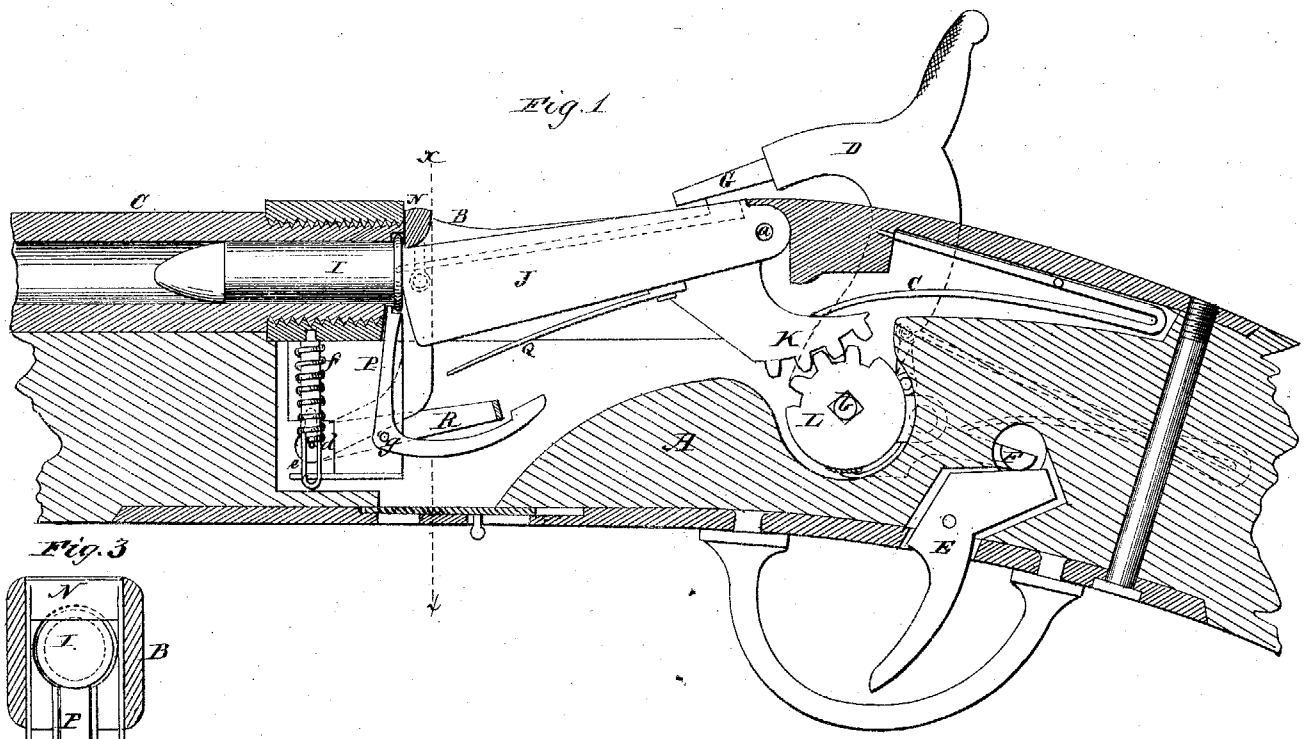
Figure 2:
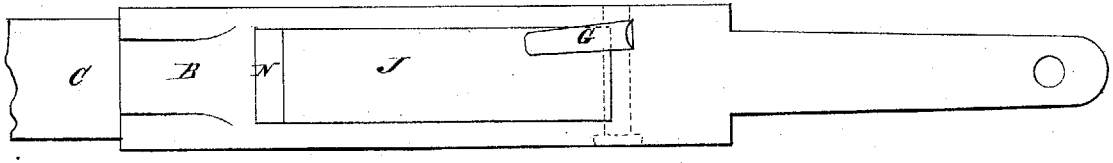
Figure 3:
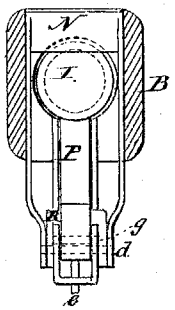

Figure 1 represents a longitudinal sectional elevation of the rear portion of a breech-loading fire-arm. Fig. 2 is a plan of the breech-receiver with barrel in part attached. Fig. 3 is a transverse section through line *x x* in Fig. 1.

Referring to the accompanying drawing, A represents a gun-stock of any suitable description; B, the breech-chamber fitted therein, and into the front end of which the barrel C is screwed. D is the hammer; E, the trigger; F, the sear, and G the firing-pin. I represents a cartridge in the position it occupies when inserted in the gun. J is the breech block or piece pivoted as at *a*. This breech-block is worked inward to open the breech, and vice versa to close it, the same being geared by a toothed segment or curved rack, K, attached to it, with a part pinion, L, fast on the hammer-shaft *b*, said rack having a spring, *c*, pressing on the back of it. Thus geared with the hammer, the breech-block is opened on or by the act of cocking the hammer, and closed, through spring-pressure, by a reverse action of the latter in firing. N is a keeper or retainer for holding the cartridge in place after insertion, when the breech is open. This keeper, which, when down, projects slightly in rear of the head of the shell at its top, has a vertical-sliding action, and is connected, by a bent arm and cross-pin, *d*, with a slotted guide, *e*, around which is a light spring, *f*, that operates to hold the keeper N down. To raise said keeper, when it is necessary to remove an exploded shell, and to operate the shell-extractor P, the breech-block J is made to carry a spring, Q, of sufficient strength to operate the keeper, shell-extractor, and to lift the breech-block, said spring being caused first to act upon the keeper, and afterward on the extractor, by or through a jaw-shaped lever, R, pivoted as at *g*, and connected with the keeper. This is done, when required, by working the hammer slightly past full-cock, such action, by the gear of the hammer with the breech-block, causing the spring Q to press on the lever R, so as to elevate the keeper, and subsequently, through the lever, to operate the shell-extractor. On letting the hammer fly back again to full-cock, the keeper N and extractor P assume their normal or closed positions. The keeper N is so shaped that the cartridge, in being inserted, lifts it without any special movement of the hammer or breech-block, but after the cartridge has been inserted, said keeper forms a perfect guard to the cartridge, to keep it from dropping out when the hammer stands at full-cock and the breech is open.

The breech-block, it will be observed, closes simultaneously with the striking action of the hammer, only completing its closing action before the cartridge is fired, and is opened again on cocking the hammer. This gear and action of the hammer and breech-block admit of a rapid repeated firing, while the entire mechanism is effectually protected from injury by the weather.

What is here claimed, and desired to be secured by Letters Patent, is—

1. The cartridge keeper or retainer N, constructed for operation by the breech-block, or by the hammer, in working the latter back, to effect the lift of said keeper, substantially as specified.

2. The combination, with the breech-block J and its spring Q, of the lever R, or its equivalent, keeper or retainer N, and shell-extractor P, for operation together essentially as herein set forth.

3. The combination, in a breech-loading firearm, of a thumb-piece, projecting above the frame, a swinging breech-block, pivoted at or near its rear end, and an extractor, the said parts being arranged substantially as described, whereby the breech can be opened and the extractor operated by a movement of the thumb-piece, as set forth.

EDWIN F. GUNN.

Witnesses:
GEO. F. GUNN,
C. A. JOHNS.